(12) United States Patent
Tsunoda et al.

(10) Patent No.: US 7,669,378 B2
(45) Date of Patent: Mar. 2, 2010

(54) OPENINGED POLYGONAL RIB STRUCTURE AND POLYGONAL RIB STRUCTURE

(75) Inventors: Kazuhiko Tsunoda, Saitama (JP); Norihiro Kurata, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 1204 days.

(21) Appl. No.: 11/225,181

(22) Filed: Sep. 14, 2005

(65) Prior Publication Data
US 2006/0075693 A1 Apr. 13, 2006

(30) Foreign Application Priority Data
Sep. 24, 2004 (JP) ............................. 2004-278543

(51) Int. Cl.
*E04H 1/00* (2006.01)
*E04B 1/32* (2006.01)
*E04B 1/18* (2006.01)

(52) U.S. Cl. ........................ 52/633; 52/79.8; 52/80.1; 472/92; 428/95

(58) Field of Classification Search .................. 52/79.8, 52/80.1, 633; 472/92; 428/95
See application file for complete search history.

(56) References Cited

U.S. PATENT DOCUMENTS

| | | | |
|---|---|---|---|
| 3,225,509 A | 12/1965 | May | |
| 3,285,401 A | 11/1966 | May | |
| 3,811,130 A | 5/1974 | Townsend | |
| 3,982,057 A * | 9/1976 | Briggs et al. | 428/73 |
| 4,648,136 A * | 3/1987 | Higuchi | 2/2.5 |
| 4,666,130 A | 5/1987 | Denman et al. | |
| 5,205,221 A * | 4/1993 | Melin et al. | 108/51.3 |
| 5,444,881 A * | 8/1995 | Landi et al. | 5/708 |
| 5,509,484 A * | 4/1996 | Landi et al. | 168/14 |
| 5,918,309 A * | 7/1999 | Bachner, Jr. | 2/2.5 |
| 6,247,745 B1 * | 6/2001 | Carroll et al. | 188/371 |
| 6,418,832 B1 * | 7/2002 | Colvin | 89/36.02 |
| 6,591,456 B2 * | 7/2003 | DeLuca et al. | 16/431 |
| 6,625,830 B2 * | 9/2003 | Lampel | 5/653 |
| 6,682,128 B2 * | 1/2004 | Carroll et al. | 296/187.03 |
| 6,959,505 B2 * | 11/2005 | Poe | 36/43 |
| 6,969,548 B1 * | 11/2005 | Goldfine | 428/159 |

(Continued)

FOREIGN PATENT DOCUMENTS

JP 7-105013 A 4/1995

(Continued)

*Primary Examiner*—Richard E Chilcot, Jr.
*Assistant Examiner*—Mark R Wendell
(74) *Attorney, Agent, or Firm*—Birch, Stewart, Kolasch & Birch LLP

(57) ABSTRACT

The present invention relates to a polygonal rib structure having ribs directed orthogonal to one plane and intersecting each other to form polygonal shapes. More particularly, to a shock absorbing polygonal rib structure. In a polygonal rib structure having ribs directed orthogonal to one plane and intersecting each other to form polygonal shapes, a thickened central portion located at a substantially central portion in the longitudinal direction of each side of the polygonal rib is bisected. The opposed parting surfaces formed upon the bisection are spaced from each other to form an opening portion, and each side of the polygonal rib is so shaped that the cross-sectional area of the opening portion is reduced as one goes from the opening end toward the depth. Thus, an opened polygonal rib structure is formed.

18 Claims, 15 Drawing Sheets

U.S. PATENT DOCUMENTS

| | | | |
|---|---|---|---|
| 7,254,843 B2* | 8/2007 | Talluri | 2/411 |
| 2003/0005549 A1* | 1/2003 | DeLuca et al. | 16/430 |
| 2004/0154252 A1* | 8/2004 | Sypeck et al. | 52/506.01 |
| 2006/0242752 A1* | 11/2006 | Talluri | 2/412 |

FOREIGN PATENT DOCUMENTS

| | | |
|---|---|---|
| JP | 9-105013 A | 4/1997 |
| JP | 2000-297835 A | 10/2000 |

* cited by examiner

US 7,669,378 B2

OPENINGED POLYGONAL RIB STRUCTURE AND POLYGONAL RIB STRUCTURE

CROSS-REFERENCE TO RELATED APPLICATIONS

The present application claims priority under 35 USC 119 to Japanese Patent Application No. 2004-278543 filed on Sep. 24, 2004 the entire contents of which are hereby incorporated by reference.

FIELD OF THE INVENTION

The present invention relates to a polygonal rib structure having ribs directed orthogonal to one plane and intersecting each other to form polygonal shapes, and particularly a shock absorbing polygonal rib structure.

DESCRIPTION OF BACKGROUND ART

A honeycomb structure having a hexagonal cross-sectional shape is disclosed in Japanese Patent Laid-Open No. Hei 9-105013.

The honeycomb structure disclosed in Japanese Patent Laid-Open No. Hei 9-105013 has a structure in which a surface formed by connecting end edges of ribs arranged in a honeycomb shape is a curved surface, and it has been attempted to apply the honeycomb structure to a shock absorbing member for helmets.

In manufacturing this honeycomb structure, as shown in FIGS. 20 and 21 of the drawings, a band-like blank material 01 that is directed rectilinearly in one direction and has a rectangular cross-sectional shape is fed between a pair of truncated conical rolls 02, and is rolled to have an elongate trapezoidal cross-sectional shape as shown in FIG. 21. Thus, a band-like blank material 01A is obtained in which the band-like blank material 01 directed rectilinearly in one direction is spirally wound.

The band-like blank material 01A that is spirally wound is divided into a plurality of portions, for example, three portions evenly over the winding direction, as shown in FIG. 23. The surface of the arcuate band-like blank material 01B is divided at regular angular intervals from the spiral center O into sections $(X_1, X_2, X_3, X_2)(X_1, X_2, X_3, X_2)\ldots$, as shown in FIG. 22. In the surface of one of the adjacent arcuate band-like blank materials 01B, an adhesive is applied to the sections $X_1$ intermediated by the three sections $X_2, X_3, X_2$. In the surface of the other of the adjacent arcuate band-like blank materials 01A, an adhesive is applied to the central section $X_3$ located at an intermediate position between the adhesive-coated sections $X_1$. After curing of the adhesives, both upper and lower end portions of the band-like blank materials 01B that are divided into arcuate forms are broadened from each other as shown in FIG. 24, whereby a honeycomb structure as shown in FIG. 14 can be manufactured.

In order to manufacture the honeycomb structure disclosed in Japanese Patent Laid-Open No. Hei 9-105013, a process is used in which the rectangular band-like blank material 01 having a cross-sectional shape with a fixed thickness over the longitudinal direction is formed into the band-like blank material 01A having an elongate trapezoidal cross-sectional shape. It is necessary to prepare a band-like blank material 01 which is free of dispersions in the width direction and in the thickness over the longitudinal direction thereof. At the same time, it is necessary that the accuracy of the outer peripheral surfaces of the pair of truncated conical rolls 02 and the accuracy of the parallelism and size between the roll axes should be high. Moreover, a large number of working steps is required. As a result, productivity is low, and it is impossible to obviate a high cost.

In addition, it has been difficult to apply the structure disclosed in Japanese Patent Laid-Open No. Hei 9-105013 to polygonal rib structures other than the honeycomb structure.

SUMMARY AND OBJECTS OF THE INVENTION

The present invention pertains to an improvement in a polygonal rib structure which overcomes the above-mentioned difficulties. In one embodiment of the present invention a polygonal rib structure is provided which is rich in mass-producibility and is low in cost.

An embodiment of the present invention resides in an opened polygonal rib structure having ribs directed orthogonal to one plane and intersecting each other to form polygonal shapes. A thickened central portion located at a substantially central portion in the longitudinal direction of each side of the polygonal rib is bisected, and the opposed parting surfaces formed upon the bisection are spaced from each other to form an opening portion. Each side of the polygonal rib is shaped so that the cross-sectional area of each opening portion is reduced along the direction from the opening end toward the depth.

An embodiment of the present invention resides in an opened polygonal rib structure, wherein the shape and size of the rhombic opening portions of the polygonal rib are varied as one goes in one direction or a plurality of directions in the one plane.

An embodiment of the present invention resides in an opened polygonal rib structure wherein the opening portion is closed, and the outer peripheral surface of the opening portion is in contact with a rib edge on the side where the opening area is wider and is formed as a projectingly curved surface.

An embodiment of the present invention resides in a polygonal rib structure wherein the cross-sectional shape of the polygonal rib is a set of connected regular hexagons or rectangles.

An embodiment of the present invention resides in a polygonal rib structure wherein the polygonal rib structure is a shock absorbing member.

An embodiment of the present invention resides in a polygonal rib structure wherein the polygonal rib structure is a shock absorbing member for a helmet.

An embodiment of the present invention resides in a mold for molding an opened polygonal rib structure, comprised of an upper-lower pair of molds, wherein one of the molds has a structure in which a tapered tetragonal pyramidal male mold being rhombic in cross-sectional shape and tapered toward the tip end thereof is located at the center of each outer peripheral surface of a virtual regular polygonal columnar surface, and the longitudinal section of the tapered tetragonal pyramidal male mold is disposed along the virtual regular polygonal columnar surface. The other of the molds has a structure in which a regular polygonal groove with a fixed width is formed, with the virtual regular polygonal columnar surface as a center. A V-shaped recessed portion that is gradually reduced toward the groove depth is formed at the center in the longitudinal direction of the regular polygonal groove.

An embodiment of the present invention resides in a method of molding a polygonal rib structure, including the steps of charging the space between the pair of molds with a molding material and thereafter bringing the opposed wall surfaces of the tetragonal pyramidal opening portion formed by the tapered tetragonal pyramidal male mold into contact with each other to constitute a polygonal rib structure.

According to an embodiment of the present invention, an opened polygonal rib structure is provided having ribs directed orthogonal to one plane and intersecting each other to form polygonal shapes wherein a tapered tetragonal pyramidal opening portion having a rhombic sectional shape is formed in a thickened central portion located at substantially a central portion in the longitudinal direction of each side of the polygonal rib that can be mass-produced at low cost.

According to an embodiment of the present invention, the outer peripheral surface in contact with the rib edges of the polygonal rib can be so varied that the radius of curvature varies from location to location.

According to an embodiment of the present invention, by closing the rhombic tapered tetragonal pyramidal opening portions a polygonal rib structure is formed wherein the outer peripheral surface of the opening portion is in contact with the rib edge on the side where the opening area is broader that is formed as a projectingly curved surface that can be easily produced.

According to an embodiment of the present invention, a polygonal rib structure wherein the cross-sectional shape of the polygonal rib is a set of connected regular hexagons or rectangles can be easily produced.

According to an embodiment of the present invention, a polygonal rib structure that is light in weight and high in shock absorbing property can be obtained.

According to an embodiment of the present invention, by adding the polygonal rib structure to the inner peripheral surface of a helmet, a helmet is obtained that is light in weight and high in shock absorbing property and inexpensively to manufacture.

By using the mold according to the present invention, the polygonal rib structure can be easily obtained inexpensively.

By applying the method of molding according to the present invention, the polygonal rib structure can be easily mass-produced at a low cost.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Now, one embodiment of the present invention shown in FIGS. 1 to 14 will be described.

Figure 1:
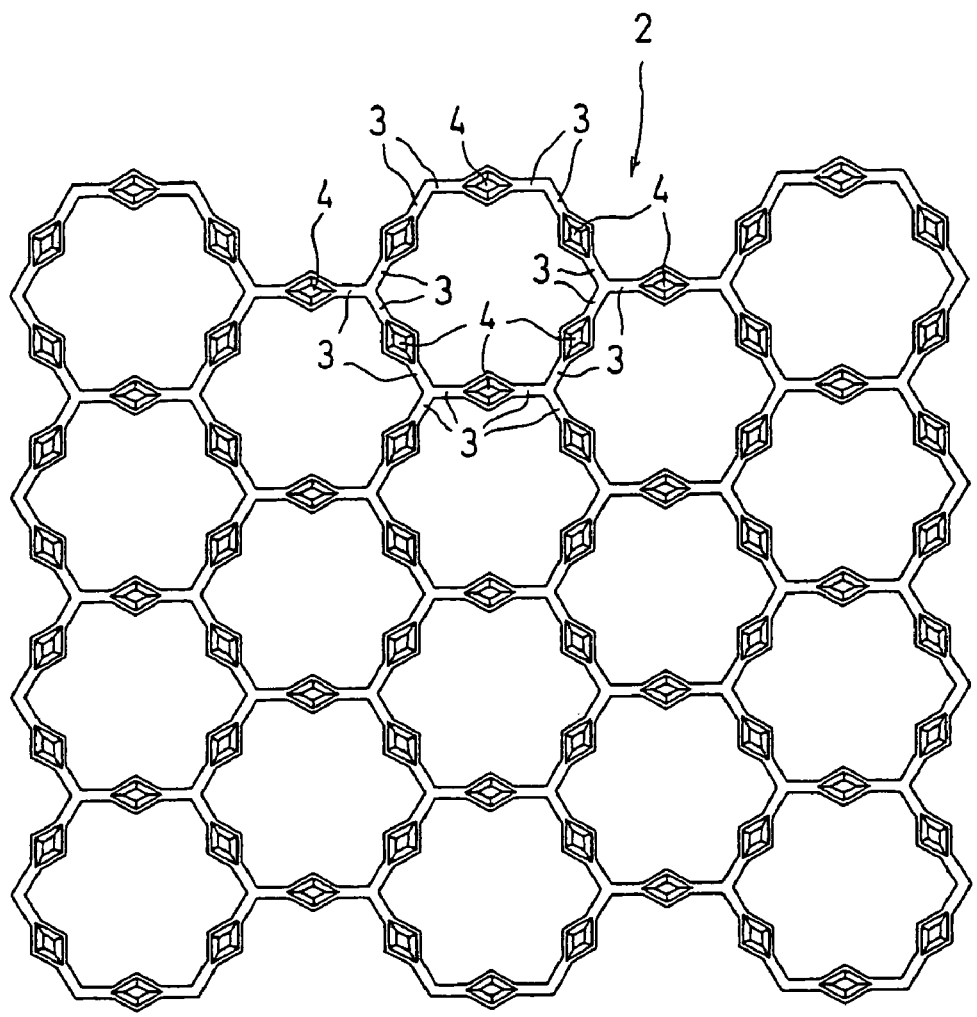
FIG. 1 is a plan view of an opened hexagonal rib structure according to one embodiment of the present invention.
Figure 2:
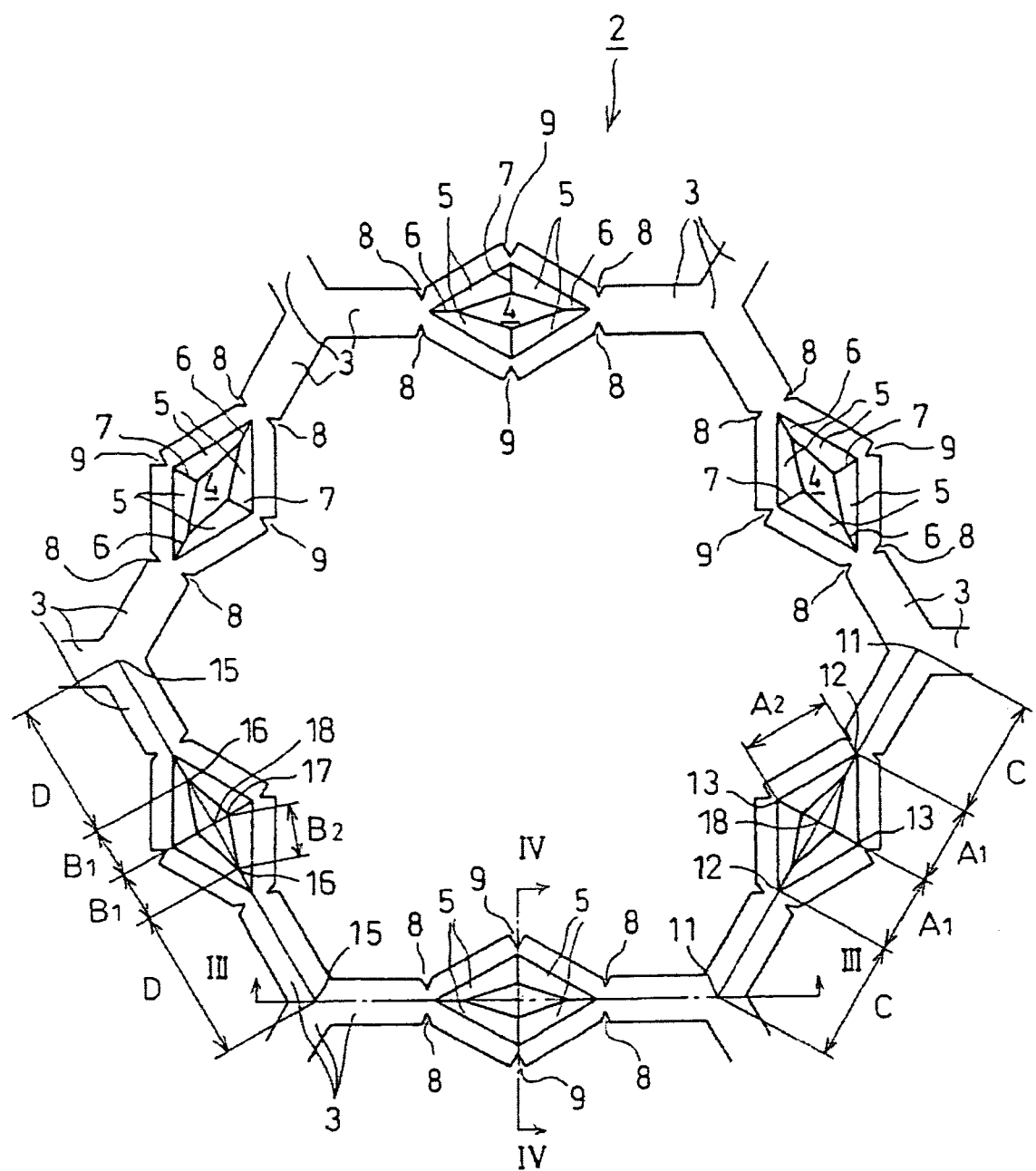
FIG. 2 is an enlarged view of a major part of FIG. 1.
Figure 3:
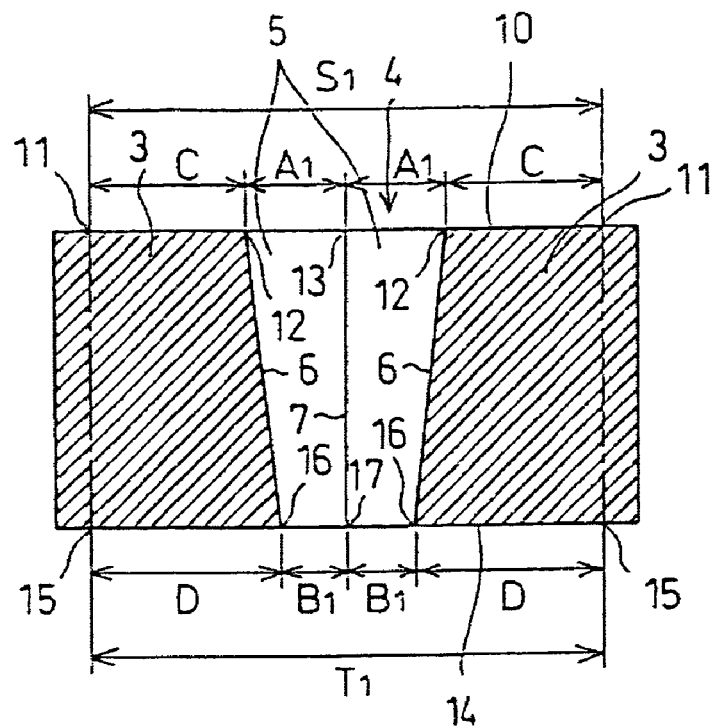
FIG. 3 is a vertical sectional view taken along line III-III of FIG. 2.
Figure 4:
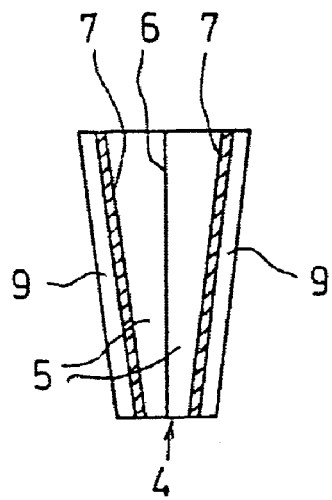
FIG. 4 is a vertical sectional view taken along line IV-IV of FIG. 2.

An opened hexagonal rib structure 2 according to one embodiment of the invention is shown in FIG. 1. FIG. 2 is an enlarged plan view of a major part of this embodiment of the present invention.

In the opened hexagonal rib structure 2, end portions of ribs 3 are integrally joined to each other at angular intervals of 120°, a thickened central portion is located at a substantially central portion in the longitudinal direction of each of the ribs 3 that is bisected to form a rhombic opening portion 4. The rhombic opening portion 4 is rhombic in cross-sectional shape, and is so shaped that the cross-sectional area thereof is reduced as one goes downwardly from the upper opening end.

The outside surfaces of the ribs 3 adjacent, respectively, to a longitudinal valley line 6 directed in the longitudinal direction of the rib 3 in the opening inside surface 5 and a widthwise valley line 7 directed in the width direction of the rib 3 are provided, respectively, with a notch 8 and a notch 9 which are V-shaped in section.

Figure 5:
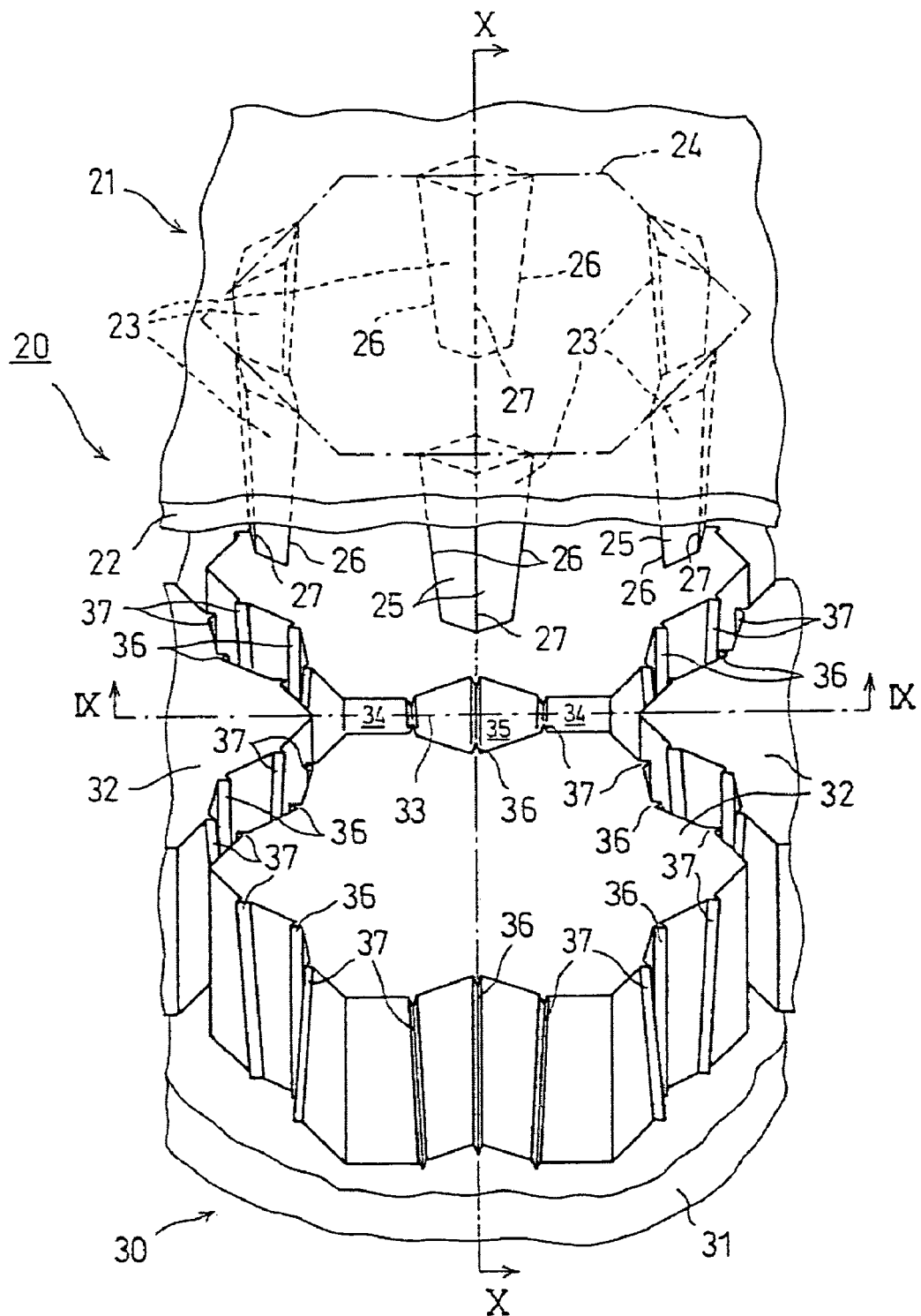
FIG. 5 is an exploded perspective view of a mold.

In order to manufacture the opened hexagonal rib structure 2 shown in FIGS. 1 and 2, a mold 20 consisting of an upper mold 21 and a lower mold 30 is used which constitute an upper-lower pair shown in FIG. 5.

Figure 6:
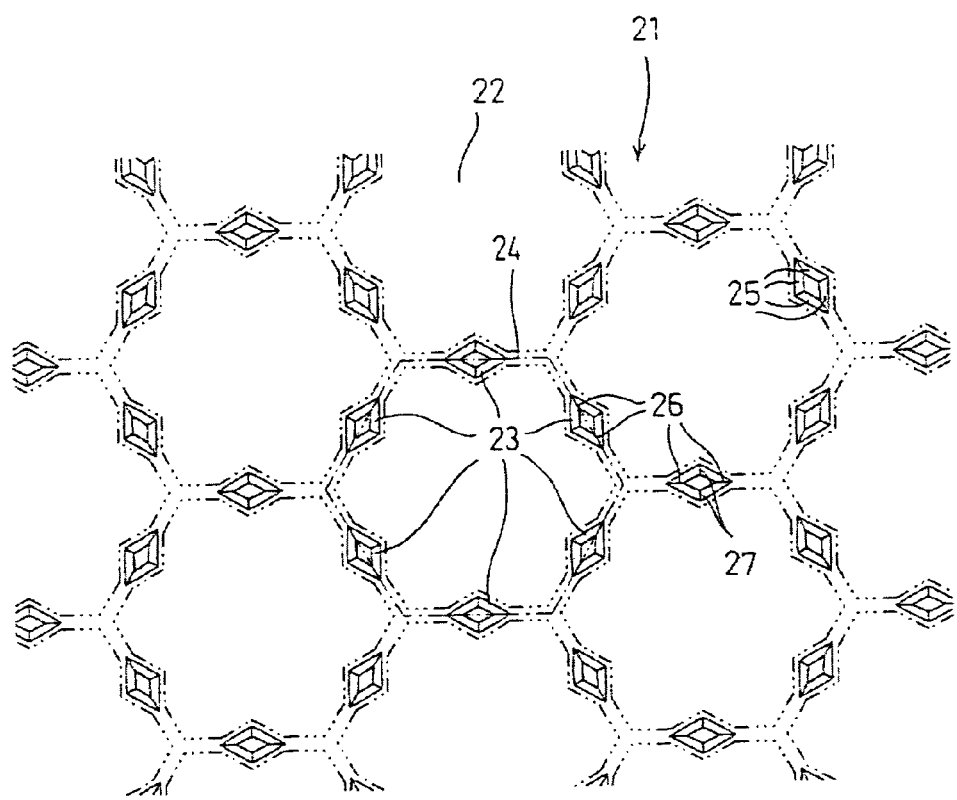
FIG. 6 is a bottom view, as viewed upwards from the lower side, of an upper mold.
Figure 7:
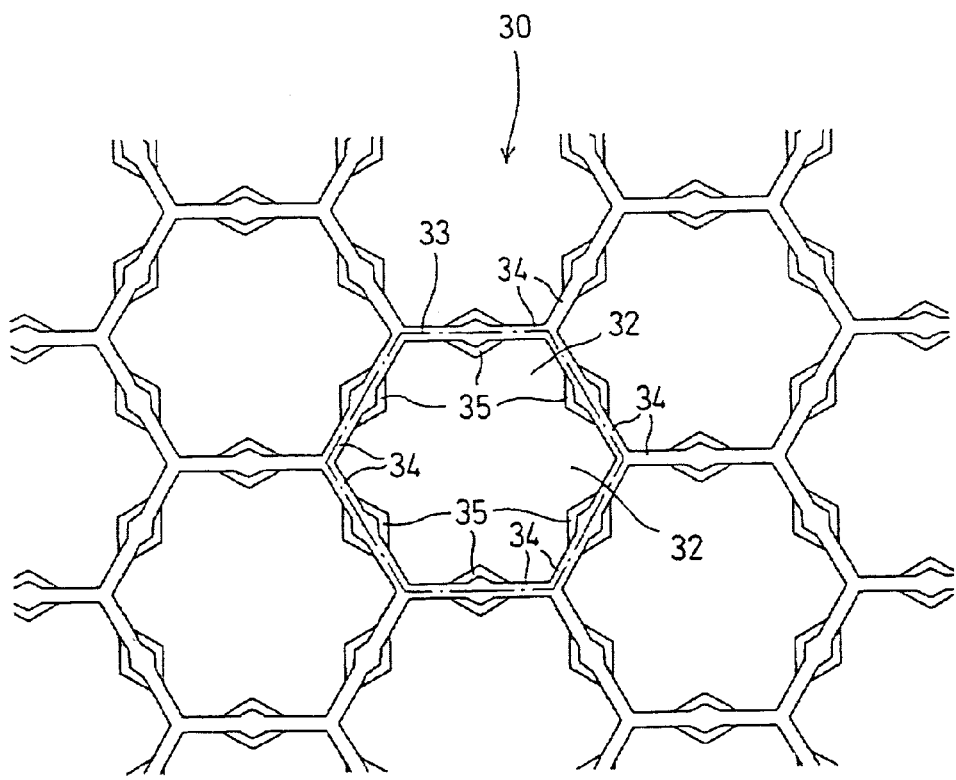
FIG. 7 is a plan view of a lower mold.
Figure 8:
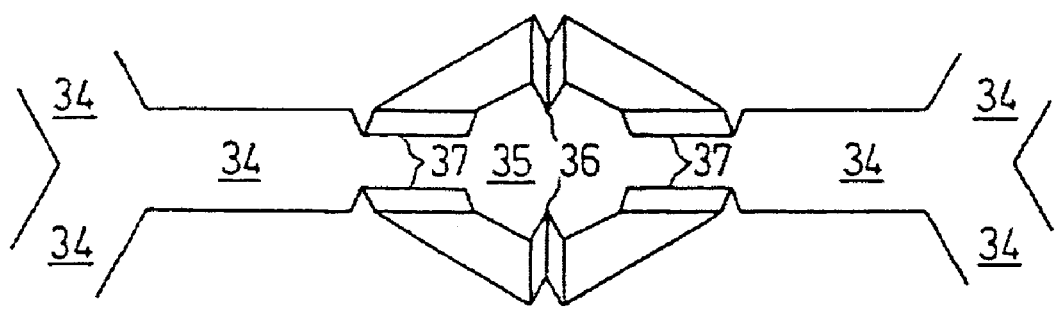
FIG. 8 is an enlarged plan view of a major part of FIG. 7.
Figure 9:
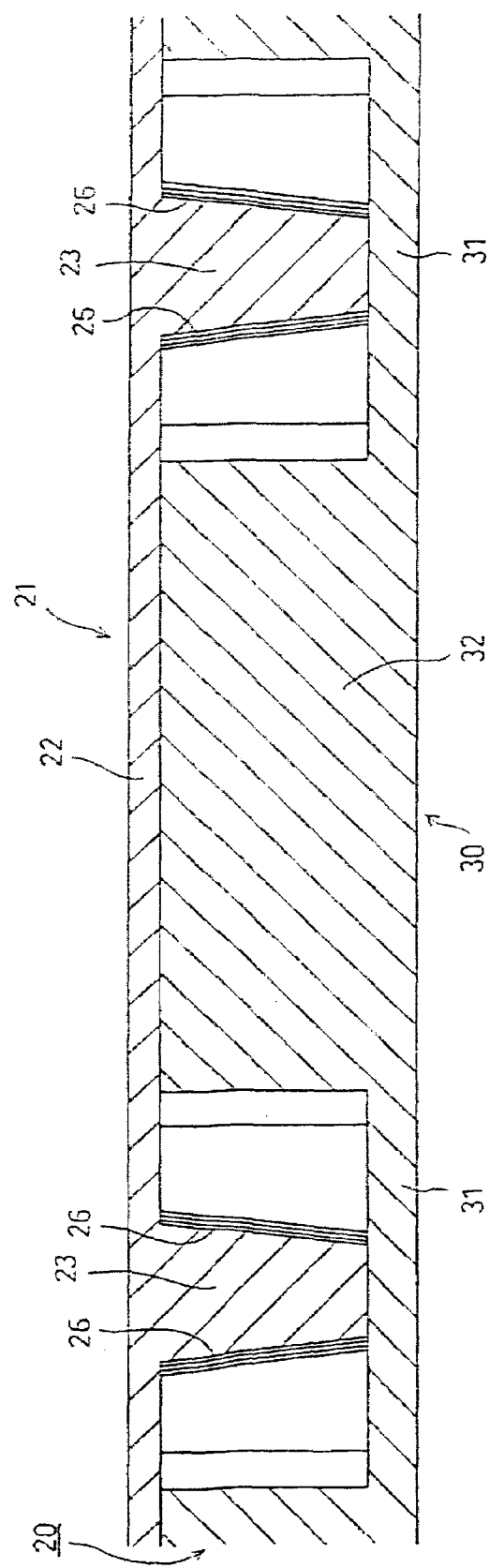
FIG. 9 is a sectional view taken along line IX-IX of FIG. 5.
Figure 10:
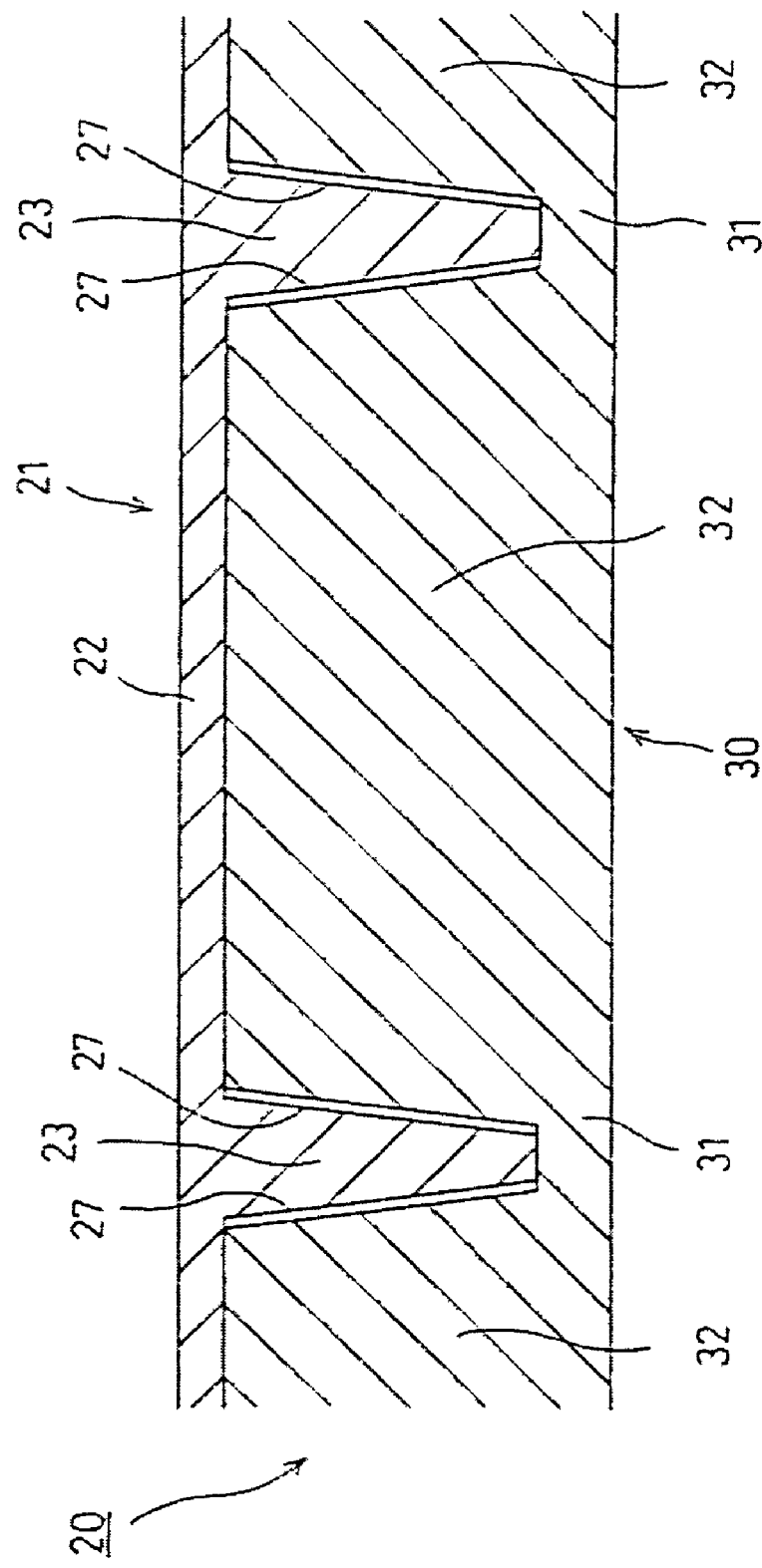
FIG. 10 is a sectional view taken along line X-X of FIG. 5.

As shown in FIGS. 5 and 6, the upper mold 21 has a structure in which truncated tetragonal pyramidal male molds 23 project downwardly from the lower surface of an upper base 22 of the upper mold 21 so that the longitudinal edge lines 26 of the truncated tetragonal pyramidal male molds 23 coincide with the sides of a virtual regular hexagon 24 indicated by dot-dash line. In addition, the truncated tetragonal pyramidal male molds 23 are located at the centers of the sides of the virtual regular hexagon 24.

In addition, the lower mold 30 has a structure in which a mold thick plate (not shown) is provided with regular hexagonal grooves 34 having a width equal to the thickness of the opened hexagonal rib structure 2 shown in FIG. 2, along virtual regular hexagons 33 indicated by dot-dash line having the same shape as the virtual regular hexagons 24 of the upper mold 21. A truncated tetragonal pyramidal recessed portion 35 having the same shape as the outside surface 25 of the truncated tetragonal pyramidal male mold 23 of the upper mold 21 is formed at a central portion of each side of the regular hexagonal grooves 34. A projected beam 36 that is triangular in section is directed in the vertical direction and is formed at the groove bottom of the truncated tetragonal pyramidal recessed portion 35. End edges of the truncated tetragonal pyramidal recessed portion 35 are provided with projecting beams 37 along the end edges, whereby the lower mold 30 has a structure in which deformed hexagonal columnar male molds 32 are integrally joined to a lower base 31.

In the condition where the truncated tetragonal pyramidal male molds 23 of the upper mold 21 are loosely fitted in the truncated tetragonal pyramidal recessed portions 35 of the lower mold 30 so that the center line of the truncated tetragonal pyramidal male mold 23 of the upper mold 21 is set coinciding with the center line of the truncated tetragonal pyramidal recessed portion 35 located at the central portion of each side of the regular hexagonal groove 34 of the lower mold 30, a thermoplastic resin is injected into the cavities between the upper mold 21 and the lower mold 30. Thus, the opened hexagonal rib structure 2 shown in FIGS. 1 to 4 can be injection molded.

Figure 11:
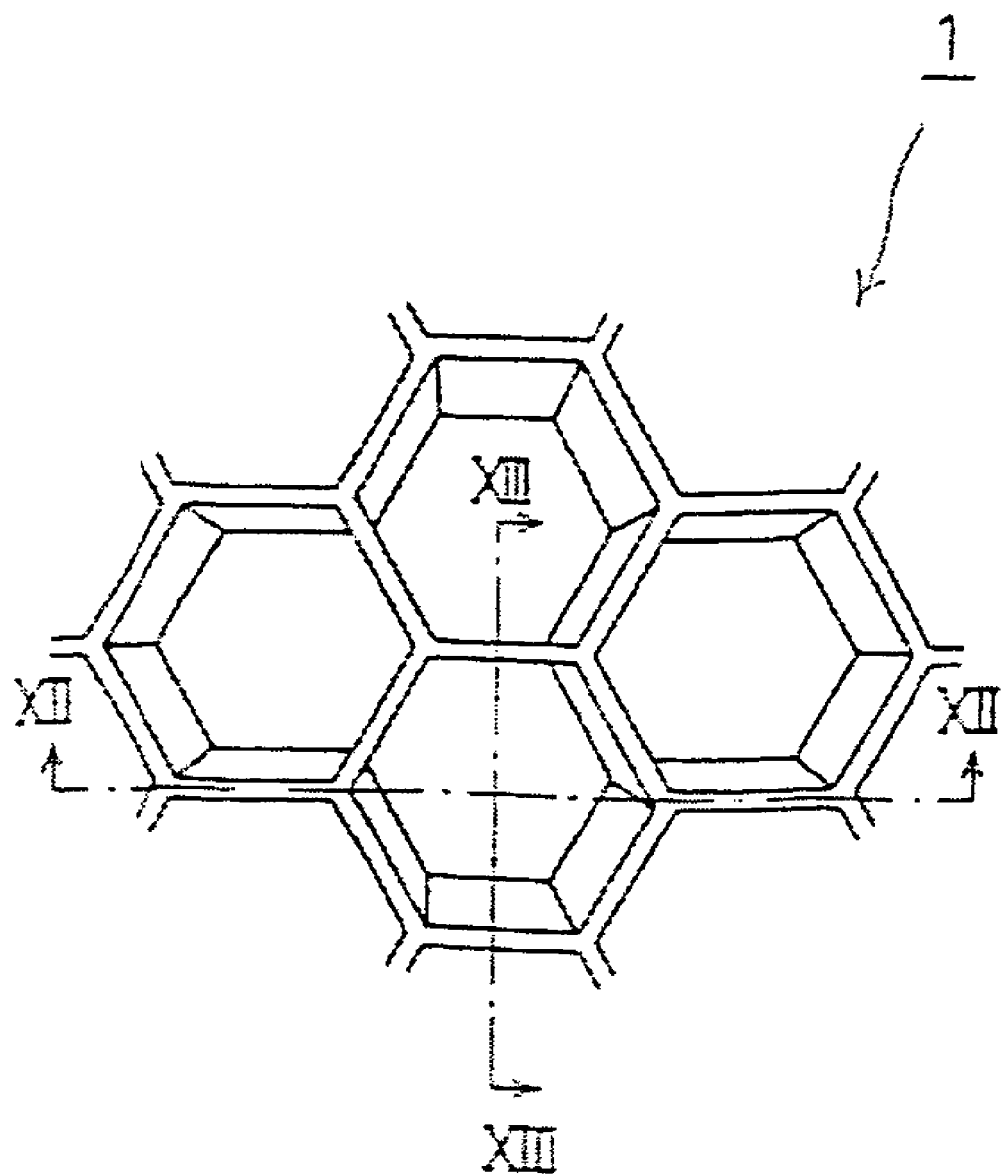
FIG. 11 is a plan view of a hexagonal rib structure.

When an adhesive is applied to the opening inside surfaces 5 of the injection-molded opened hexagonal rib structure 2 shown in FIGS. 1 to 4, and then both side surfaces of each of the rhombic opening portions 4 are pressed so as to bring the opposed widthwise valley lines 7 into contact with each other, the rhombic opening portions 4 are closed and the hexagonal rib structure 1 shown in FIG. 11 is formed.

In the rib top face 10 of the opened hexagonal rib structure 2, as shown at a right lower portion of FIG. 2, the distance $S_1$ between the rib top face intersection center point 11 where three ribs 3 intersect and the adjacent rib top face intersection center point 11 is the sum of the interval $2A_1$ of the longitudinal valley line top points 12 of both longitudinal valley lines 6 and the double 2C of the distance C between the rib top face intersection center point 11 and the longitudinal valley line top point 12, that is:

$$S_1=2(A_1+C).$$

In the rib bottom face 14 of the opened hexagonal rib structure 2, as shown at a left lower portion of FIG. 2, the distance $T_1$ between the rib bottom face intersection center point 15 where three ribs 3 intersect and the adjacent rib bottom face intersection center point 15 is the sum of the distance $2B_1$ between both longitudinal valley line bottom points 16 and the double 2D of the distance D between the rib bottom face intersection center point 15 and the longitudinal valley line bottom point 16, that is:

$$T_1=2(B_1+D)=S_1.$$

Figure 12:
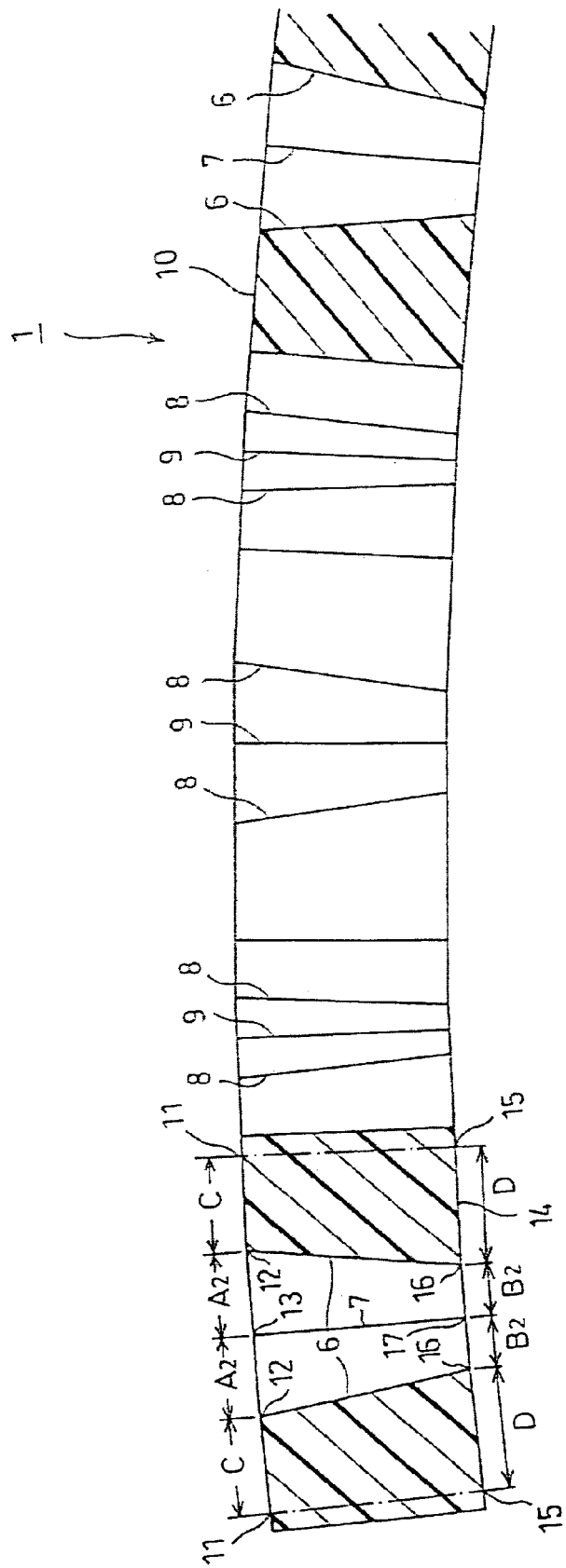
FIG. 12 is a sectional view taken along line XII-XII of FIG. 11.
Figure 13:
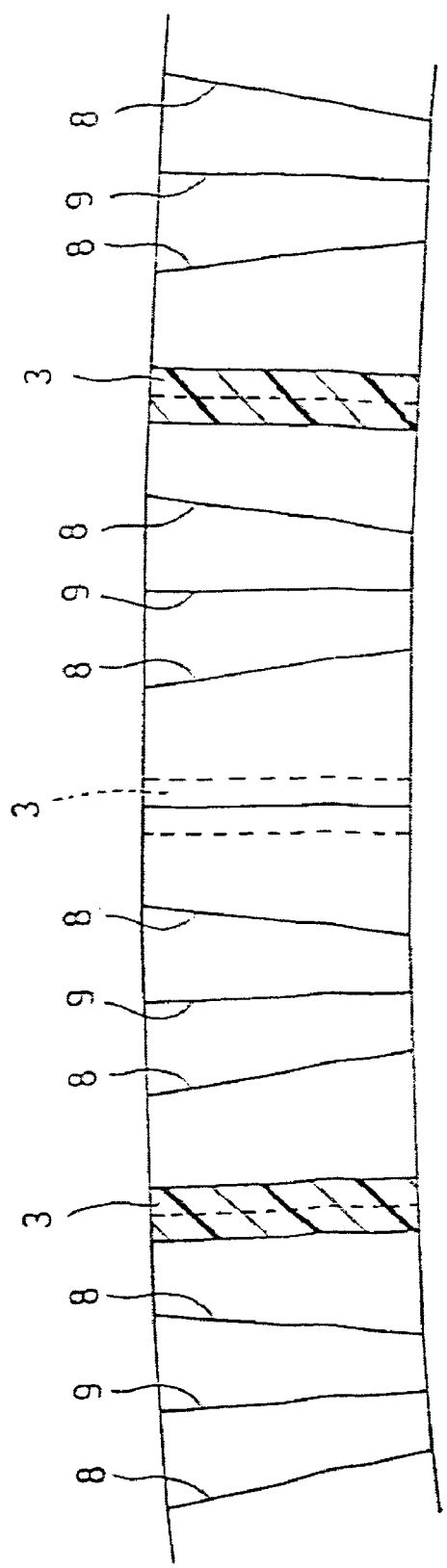
FIG. 13 is a sectional view taken along line XIII-XIII of FIG. 11.

When the rhombic opening portions 4 of the opened hexagonal rib structure 2 are closed, the widthwise valley line top points 13 of the widthwise valley lines 7 in the hexagonal rib structure 1 come into contact with each other. Therefore, as shown in FIG. 12, the distance $S_2$ between the longitudinal valley line top point 12 in the rib top face 10 and the adjacent longitudinal valley line top point 12 is the sum of the double $2A_2$ of the distance $A_2$ between the longitudinal valley line top point 12 and the widthwise valley line top point 13 and the double 2C of the distance C between the rib bottom face intersection center point 15 and the longitudinal valley line bottom point 16, that is:

$$S_2=2(A_2+C).$$

In the rib bottom face 14 of the hexagonal rib structure 1 in the condition where the rhombic opening portions 4 of the opened hexagonal rib structure 2 are closed, the distance $T_2$ between the rib bottom face intersection center point 15 and the adjacent rib bottom face intersection center point 15 is the sum of the double $2B_2$ of the distance $B_2$ between the longitudinal valley line bottom point 16 and the widthwise valley line bottom point 17 and the double 2D of the distance D between the rib bottom face intersection center point 15 and the longitudinal valley line bottom point 16, that is:

$$T_2=2(B_2+D).$$

In the rib top face 10, when the rhombic opening portions 4 are closed, the distance $S_1$ between the adjacent rib top face intersection center points 11 of the opened hexagonal rib structure 2 becomes the distance $S_2$ between the adjacent rib top face intersection center points 11 of the hexagonal rib structure 1, and the difference between the two kinds of distances is:

$$S_2-S_1=2(A_2-A_1).$$

Here, as is clear from FIG. 2, $A_2$ is the length of the oblique line 12-13 of the right-angled triangle having the longitudinal valley line top point 12, the widthwise valley line top point 13 and the opening center point 18 as apexes, and is longer than the base 12-18 of the triangle. Therefore, when the rhombic opening portions 4 are closed, the distance between both rib top face intersection center points 11 is increased by $2(A_2-A_1)$.

Similarly, in the rib bottom face 14 also, the distance $T_2$ between both rib bottom intersection center points 15 in the condition where the rhombic opening portions 4 are closed and the distance $T_1$ between both rib bottom face intersection center points 15 in the condition where the rhombic opening portions 4 are formed are in the relationship of:

$$T_2-T_1=2(B_2-B_1).$$

Thus, when the rhombic opening portions 4 are closed, the distance between both rib bottom face intersection center points 15 is increased by $2(B_2-B_1)$. However, this elongation amount is small, since $B_1$ and $B_2$ are shorter as compared with $A_1$ and $A_2$. Therefore, the surface formed by joining the rib top faces 10 is an upwardly projecting curved surface as shown in FIG. 14, which makes it possible to apply the hexagonal rib structure 1 to a helmet shock absorbing member (not shown).

According to the embodiment shown in FIGS. 1 to 14, the opened hexagonal rib structure 2 can be efficiently injection molded in a short time, by only using the mold 20 composed of the upper mold 21 and the lower mold 30 constituting an upper-lower pair and injecting a thermoplastic resin or thermosetting resin into the cavities formed between the upper mold 21 and the lower mold 30. Therefore, productivity can be enhanced, and the opened hexagonal rib structure 2 can be mass-produced at a low cost.

Figure 14:
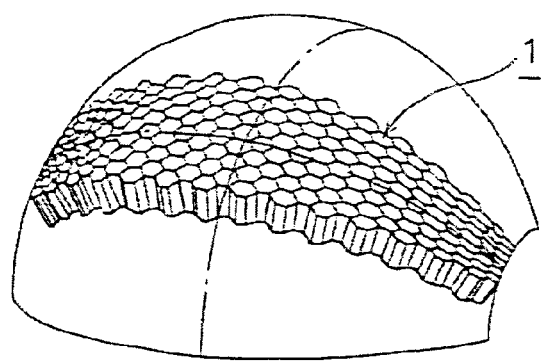
FIG. 14 is an overall perspective view of the hexagonal rib structure.

In addition, by integrally joining the opposed opening inside surfaces 5 in the molded opened hexagonal rib structure 2 by use of an adhesive, the rhombic opening portions 4 can be closed, and the hexagonal rib structure 1 curved to the upper side as shown in FIG. 14 can be produced.

Further, when a material comparatively low in shock breakage strength is used as the material for constituting the opened hexagonal rib structure 2, a structure can be obtained that is light in weight and favorable in shock absorbing property.

With the size and shape of the rhombic opening portions 4 in the opened hexagonal rib structure 2 appropriately varied depending on the location in the opened hexagonal rib structure 2, the curved surface shape of the hexagonal rib structure 1 can be conformed to the shape of a helmet, and the hexagonal rib structure can be easily applied to a shock absorbing member for helmets.

While the opposed opening inside surfaces 5 in the opened hexagonal rib structure 2 have been integrally joined by use of an adhesive, the opposed opening inside surfaces 5 in the opened hexagonal rib structure 2 may be integrally joined by fusing (welding) in the case where a thermoplastic resin is used as the material for constituting the hexagonal rib structure 1.

Figure 15:
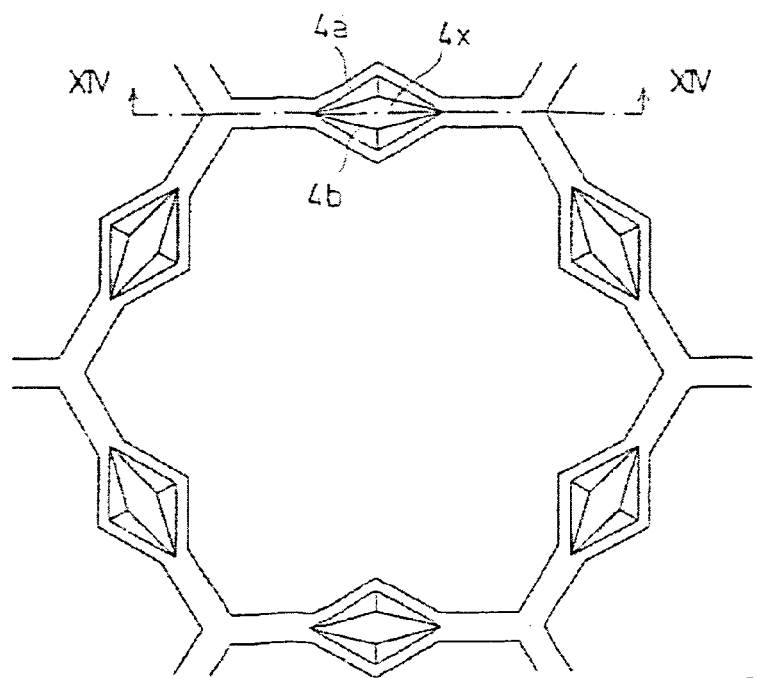
FIG. 15 is an enlarged plan view of a major part of an opened rib structure in which the shapes of rhombuses of opening portions are different.
Figure 16:
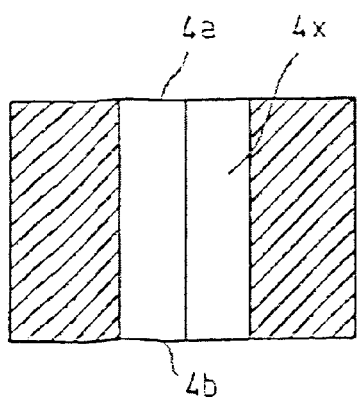
FIG. 16 is a sectional view taken along line XVI-XVI of FIG. 15.

While the rhombus of the upper opening of the rhombic opening portion 4 and the rhombus of the lower opening of the rhombic opening portion 4 have been different in size and substantially analogous in shape in the embodiment shown in FIGS. 1 to 14, there may be adopted a configuration in which, as shown in FIGS. 15 and 16, the size in the longitudinal direction of the upper opening 4a of the rhombic opening portion 4X is equal to the size in the longitudinal direction of the lower opening 4b of the rhombic opening portion 4X. However, the size in the width direction of the upper opening 4a is larger than the size in the width direction of the lower opening 4b, and the shape of the upper opening 4a is conspicuously different from the shape of the lower opening 4b.

Figure 17:
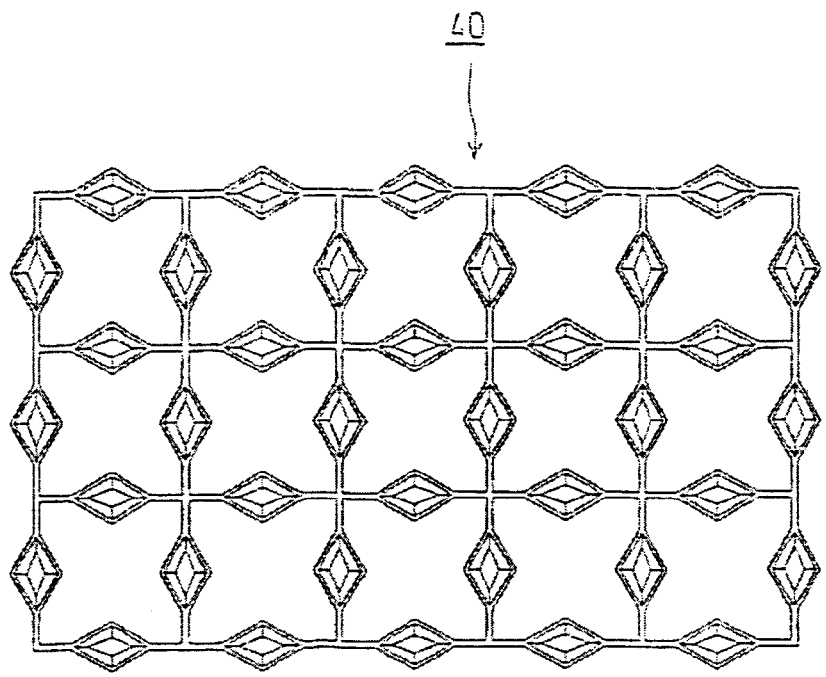
FIG. 17 is a plan view of a square rib structure according to another embodiment of the present invention.
Figure 18:
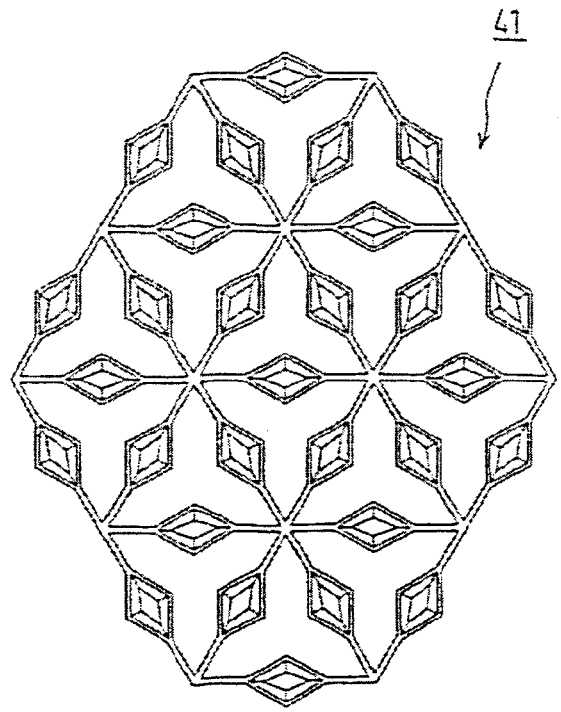
FIG. 18 is a plan view of a regular triangular rib structure according to a further embodiment of the present invention.
Figure 19:
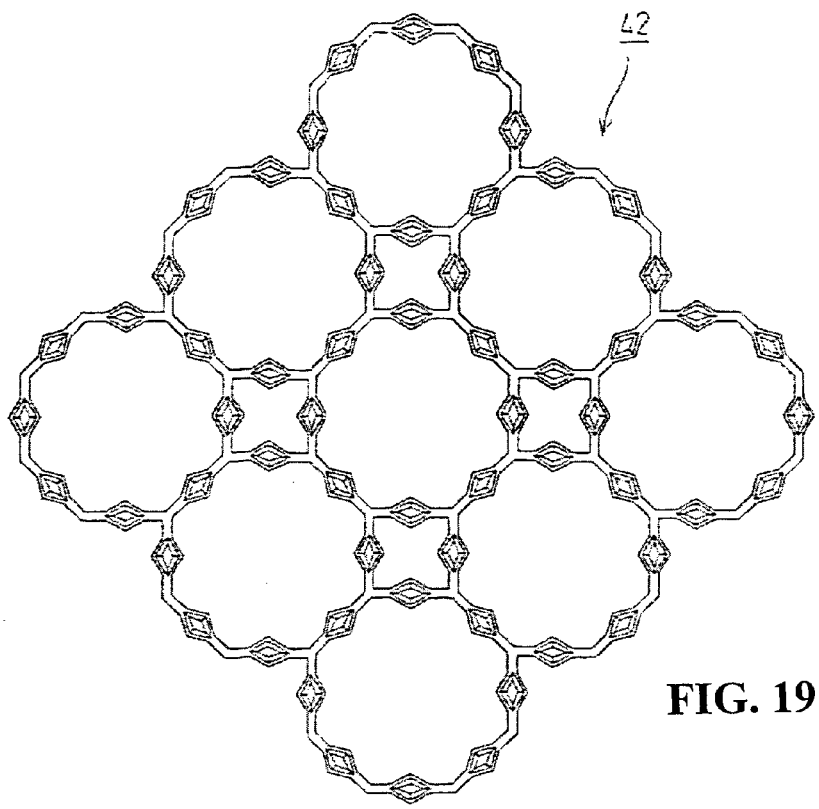
FIG. 19 is a plan view of a combined square-octagonal rib structure according to yet another embodiment of the present invention.
Figure 20:
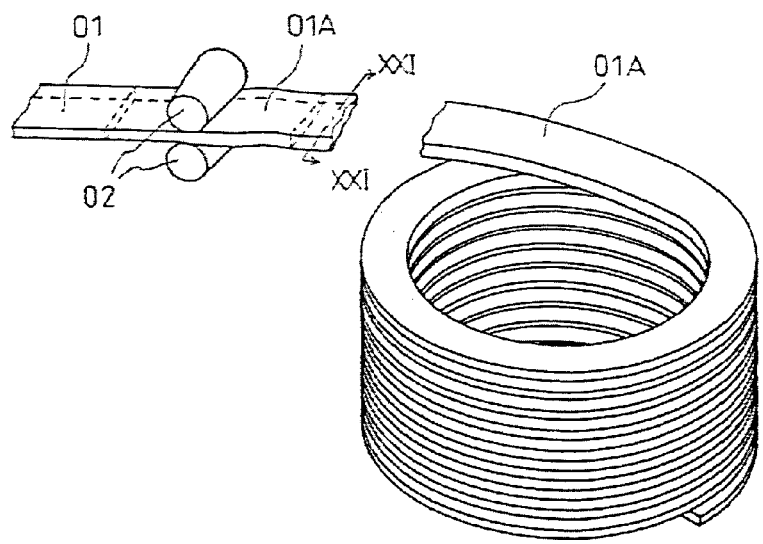
FIG. 20 is a perspective view showing a part of the process of manufacturing a hexagonal rib structure in the related art.
Figure 21:
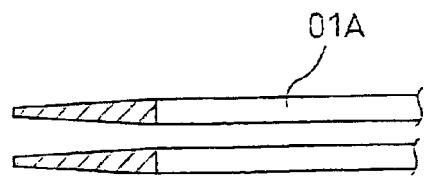
FIG. 21 is a horizontal sectional view along line XXI-XXI of FIG. 20.
Figure 22:
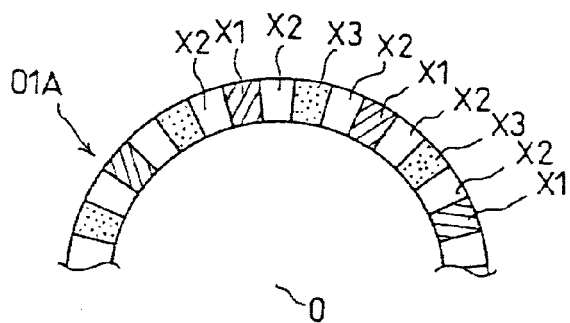
FIG. 22 is an illustration of the condition where an adhesive is applied to a band-like blank material obtained in FIG. 20.
Figure 23:
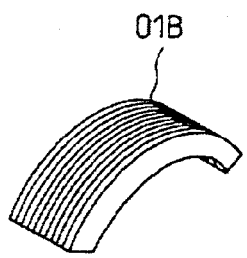
FIG. 23 is a perspective view of an arcuate blank material obtained by dividing the band-like blank material obtained in FIG. 20.
Figure 24:
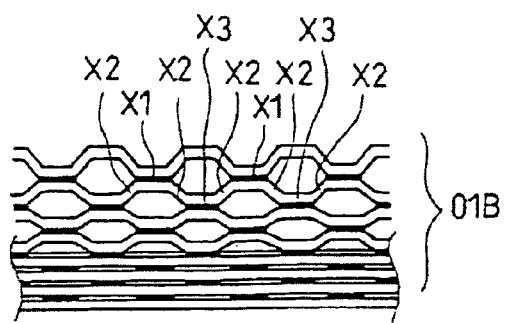
FIG. 24 is an illustration of the last step, after the adhesive shown in FIG. 22 is applied and cured.

While the polygon has been a regular hexagon in the embodiment shown in FIGS. 1 to 14, the present invention naturally is applicable also to a square rib structure 40 as shown in FIG. 17 and to a regular triangular rib structure 41 as shown in FIG. 18.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An opened polygonal rib structure having ribs directed substantially orthogonal to one plane and intersecting each other form polygonal shapes, comprising:
   a thickened central portion located at a substantially central portion in a longitudinal direction of each side of the polygonal rib, said thickened central portion being bisected, and opposed parting surfaces formed upon the bisection are spaced front each other to form an opening portion; and
   each side of said polygonal rib is shaped so that a cross-sectional area of each said opening portion is reduced along a direction front an opening end toward a depth.

2. The opened polygonal rib structure as set forth in claim 1, wherein a shape and size of the rhombic opening portions of said polygonal rib are varied in one direction or a plurality of directions in said one plane.

3. The opened polygonal rib structure as set forth in claim 1, wherein said opening portion is closed, and the outer peripheral surface of said opening portion in contact with a rib edge on the side where the opening area is wider is formed as a projecting curved surface.

4. The opened polygonal rib structure as set forth in claim 2, wherein said opening portion is closed, and the outer peripheral surface of said opening portion in contact with a rib edge on the side where the opening area is wider is formed as a projecting curved surface.

5. The polygonal rib structure as set forth in claim 3, wherein the cross-sectional shape of said polygonal rib is a set of connected regular hexagons or rectangles.

6. The polygonal rib structure as set forth in claim 4, wherein the cross-sectional shape of said polygonal rib is a set of connected regular hexagons or rectangles.

7. The polygonal rib structure as set forth in claim 3, wherein said polygonal rib structure is a shock absorbing member.

8. The polygonal rib structure as set forth in claim 5, wherein said polygonal structure is a shock absorbing member.

9. The polygonal rib structure as set forth in claim 5, wherein said polygonal rib structure is a shock absorbing member for a helmet.

10. An opened polygonal rib structure having ribs directed substantially orthogonal to one plane and intersecting each other to form polygonal shapes, comprising:
    a thickened central portion located at a substantially central portion in a longitudinal direction of each side of the polygonal rib, said thickened central portion being bisected;
    open portions being formed at opposed parting surfaces formed upon the bisection, said open portions being spaced from each other to form an opening portion; and
    each side of said polygonal rib is shaped wherein the cross-sectional area of each said opening portion is reduced along a direction from an opening end toward a depth.

11. The opened polygonal rib structure as set forth in claim 10, wherein the shape and size of the rhombic opening portions of said polygonal rib are varied in one direction or a plurality of directions in said one plane.

12. The opened polygonal rib structure as set tort in claim 10, wherein said opening portion is closed, and the outer peripheral surface of said opening portion in contact with a rib edge on the side where the opening area is wider is formed as a projecting curved surface.

13. The opened polygonal rib structure as set forth in claim 11, wherein said opening portion is closed, and the outer peripheral surface of said opening portion in contact with a rib edge on the side where the opening area is wider is formed as a projecting curved surface.

14. The polygonal rib structure as set forth in claim 12, wherein the cross-sectional shape of said rib is a set of connected regular hexagons or rectangles.

15. The polygonal rib structure as set forth in claim 13, wherein the cross-sectional shape of said polygonal rib is a set of connected regular hexagons or rectangles.

16. The polygonal rib structure as set forth in claim 12, wherein said polygonal rib structure is a shock absorbing member.

17. The polygonal rib structure as set forth in claim 14, wherein said polygonal rib structure is a shock absorbing member.

18. The polygonal rib structure as set forth in claim 14, to wherein said polygonal rib structure is a shock absorbing member for a helmet.

* * * * *